April 1, 1941.   A. N. IKNAYAN   2,237,182
METHOD OF MOUNTING TIRES
Filed May 26, 1938

INVENTOR.
ALFRED N IKNAYAN
BY *Gourley & Dudley*
ATTORNEYS

Patented Apr. 1, 1941

2,237,182

UNITED STATES PATENT OFFICE 2,237,182

METHOD OF MOUNTING TIRES

Alfred N. Iknayan, Indianapolis, Ind., assignor, by mesne assignments, to United States Rubber Company, New York, N. Y., a corporation of New Jersey Application May 26, 1938, Serial No. 210,129

4 Claims. (Cl. 152—157)

This invention relates to a method of mounting inner tubes within tire casings. More particularly, the invention relates to the mounting of a tire casing and an inflatable sponge rubber inner tube. In general, the invention includes a pneumatic tire casing and an inflatable core adaptable for insertion within the tire casing, the core comprising a sponge rubber filler formed of a multiplicity of intercommunicating cells and an inner tube wall of rubber composition enclosing the sponge rubber filler, the relationship between the tire casing and the sponge rubber filler being such that the sponge rubber filler is normally in a state of compression when uninflated and when the tire is not supporting a load.

As a support for heavy vehicles, the present tendency is to utilize pneumatic tires. However, one of the principal objections to the use of pneumatic tires in specific cases is the liability of failure because of deflation. For military purposes, such as on carriages for moving field artillery, pneumatic tires are highly desirable, but their liability to failure prevents their more extensive use.

In accordance with the practice of my invention, I provide a tire which, in effect, functions as a pneumatic tire, but if deflation should occur the vehicle may continue to be operated for great distances without any substantial loss of function of the tire. As the sponge rubber filler of my invention is in a state of compression within the tire casing, it is capable of supporting a load without the usual proper degree of inflation.

While it is understood that sponge rubber fillers have been used in pneumatic tire casings, the present invention provides that peculiar combination of a sponge rubber filler formed of intercommunicating cells confined within a rubber wall, such as the conventional inner tube, with the result that the sponge rubber core combination may be inflated, thus permitting the tire to function in all respects as the conventional pneumatic tire.

The sponge rubber filler, being under compression, forms an auxiliary means for supporting the vehicle load to an extent which appears secondary in efficiency to the function of pneumatic tires. It is, therefore, among the objects of my invention to provide a tire the primary function of which is to operate as a pneumatic tire, and which includes a secondary load supporting medium capable of sustaining the vehicle load over great distances. The combination utilizes the conventional tire casing and rim, therefore requiring no changes in these conventional constructions.

It is also an object of my invention to provide means for easily and quickly inserting a sponge rubber filler within a pneumatic tire casing.

These and other objects and advantages will appear more fully in the following detailed description, when considered in connection with the accompanying drawing, in which.

Figure 1:
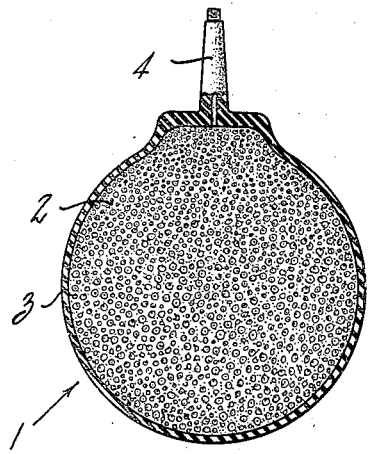
Fig. 1 is a transverse view, in section, of a core member embodying the features of my invention.
Figure 4:
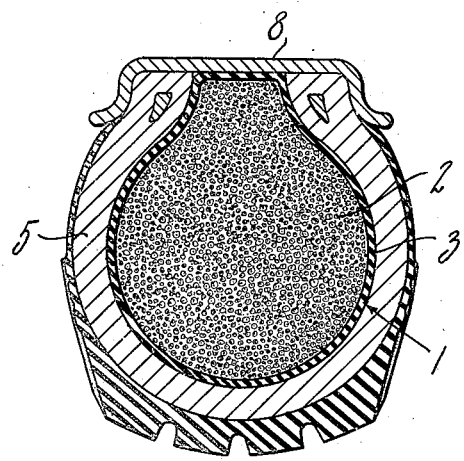
Fig. 4 is a transverse view, in section, illustrating the core member of my invention in assembly with a tire and rim.

Referring to the drawing, and in particular to Fig. 1, I show an embodiment of my invention which comprises a core member 1 having a sponge rubber filler 2 forming an annular member having a cross sectional shape which conforms substantially with the interior of a pneumatic tire casing. The composition of the rubber filler is such that substantially all of the cells which form the sponge rubber do not have a continuous wall structure, thus forming intercommunicating cells through which fluid may be admitted to inflate the sponge rubber filler. The periphery of the sponge rubber filler is covered with an air impermeable layer 3 of rubber composition, which layer forms a member substantially similar to the conventional inner tube. Preferably, the layer 3 is vulcanized directly to the sponge rubber filler 2. A conventional valve stem 4 is attached to the layer 3 and forms means through which the core member may be inflated or deflated.

Figures 2, 3:
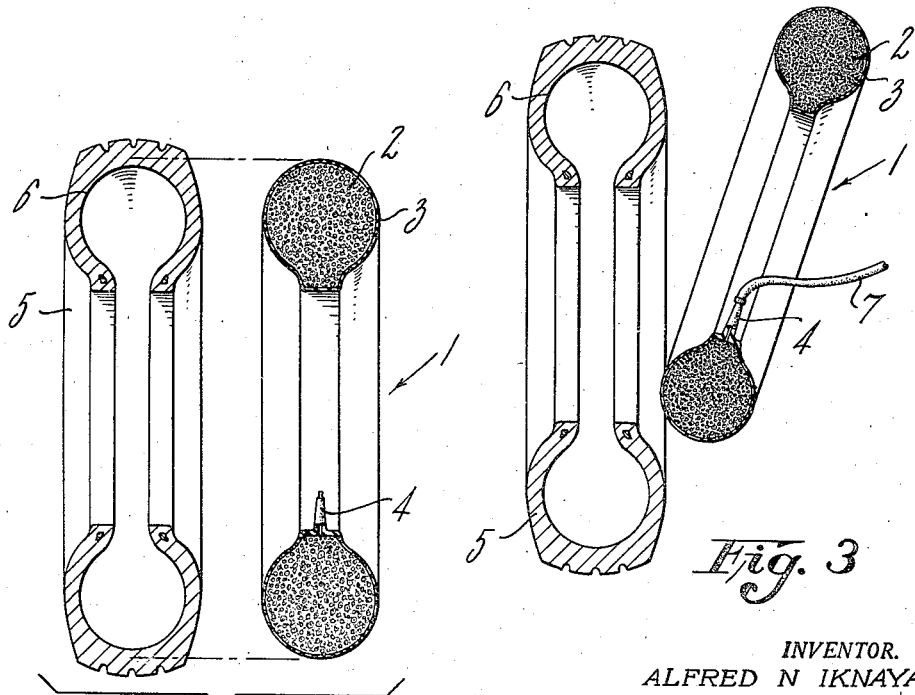
Fig. 2 is a comparative view, in transverse section, of a tire and a core member, showing the relative proportions of the core member in its normal state.
Fig. 3 is a comparative view, in transverse section, of a pneumatic tire and a core member, the core member being subjected to reduced air pressure for the purpose of inserting it within the casing.

Fig. 2 shows a conventional pneumatic tire casing 5 having a cavity or chamber 6. In Fig. 2 it will be noted that the core member 1 is larger than the chamber 6 of the tire 5. This relative enlargement exists both in the diameter of the core member and in its cross sectional width. The core member 1 in its normal state is larger than the chamber 6 of the tire casing by at least 15 percent, this figure representing the volume and volumetric capacity of the core member and tire chamber, respectively.

One of the problems of providing a pneumatic tire with a sponge rubber filler is the difficulty encountered in inserting the sponge rubber filler within the tire casing. Due to the intercommunicating cells of the sponge rubber filler 2 and the enclosure formed by the inner tube wall 3, I reduce the air pressure within the core member 1 to a degree below normal atmospheric pressure. This may be accomplished by connecting a hose 7 (Fig. 3) to the valve stem 4, the opposite end of the hose 7 being connected to some conventional means of reducing pressure, such as a vacuum pump. Before connecting the hose 7 to the valve stem 4, it may be necessary to remove the valve inside or mechanism from the valve stem.

When the interior of the core member is subjected to reduced pressure, the entire member contracts. Due to this reduction in size and rigidity of the core member, it may be more easily inserted within the tire casing, and the tire casing with the assembled core member may be more easily assembled on the rim. After the core member is positioned within the tire casing, and the core member and tire casing are assembled on the rim, the air hose may be removed from the valve stem, permitting the core member to expand within the chamber of the tire casing thus assembled on the rim.

When the core member and tire are properly assembled on the rim, the valve mechanism is inserted in the valve stem, and the core member may be inflated to the proper degree of fluid pressure.

In operation, the tire and core member combination of my invention functions substantially as a conventional pneumatic tire when the core member is inflated. However, the sponge rubber filler being under compression also aids in supporting the tire load. The degree of compression in the sponge rubber filler is such that its capability of sustaining the load on the tire is slightly less than when the tire is inflated. Upon deflation of the tire all of the load is sustained by the sponge rubber core. When this occurs the tire deflects slightly more than when inflated, but such additional deflection is permissible. Actual tests have demonstrated that a tire embodying the features of my invention was run 1083 miles inflated and 1011 miles uninflated, at an average speed of 40 miles per hour. At the termination of the test the tire was still in serviceable condition.

In the preferred practice of the invention the sponge rubber filler uninflated and not under load is confined in the tire casing in a state of compression. It is also contemplated within the scope of the present invention to utilize a tire and filler combination in which the filler is not in compression when uninflated and not under load. The rigidity of the sponged rubber filler when uninflated and normally uncompressed is such that it will operate satisfactorily in sustaining the load imposed upon the tire.

While one form of embodiment of my invention has been shown and described it is to be understood that the invention is susceptible of other modifications such as the use of an inflated sponge rubber filler within single tube tires as bicycle or industrial tires. In single tube tires it is not necessary that the volume of the sponge rubber filler be greater than the volume of the tire chamber. The loads imposed on single tube tires are generally less than loads imposed on tires of the straight side type. Therefore, in single tube tires the sponge rubber filler in its normal, uncompressed state provides adequate support for sustaining loads, and in such state results in a reliable safety medium for effective operation in event of deflation of the tire.

From the foregoing it is obvious that the tire combination of my invention is novel in that it is primarily a pneumatic tire, while its secondary features are that it is a safety tire in respect to punctures or blowouts. It is also an emergency tire in that after deflation its continued operation for long distances is permissible without major damage to the tire assembly.

While I have shown and described a present preferred method for practicing my invention, it is to be understood that the invention may be otherwise practiced within the spirit thereof and the scope of the appended claims.

Having thus described my invention, what I claim and desire to protect by Letters Patent is:

1. The method of mounting an inflatable sponge rubber filler within a tire casing which comprises the steps of, reducing the air pressure within the sponge rubber filler below normal atmospheric pressure whereby the sponge rubber filler contracts, mounting the filler within the tire casing while the filler is in a contracted state, and permitting the filler to expand within the tire casing.

2. The method of mounting an inflatable sponge rubber filler within a tire casing which comprises the steps of, reducing the air pressure within the sponge rubber filler below normal atmospheric pressure whereby the sponge rubber filler contracts, mounting the filler within the tire casing while the filler is in a contracted state, permitting the filler to expand within the tire casing, and inflating the filler.

3. The method of mounting a tire and an inflatable sponge rubber filler on a rim which comprises the steps of, reducing the air pressure within the sponge rubber filler below normal atmospheric pressure whereby the sponge rubber filler contracts, mounting the filler within the tire casing while the filler is in a contracted state, mounting the casing and filler on the rim while the filler is in a contracted state, and permitting the filler to expand after the casing is mounted on the rim.

4. The method of mounting a tire and an inflatable sponge rubber filler on a rim which comprises the steps of, reducing the air pressure within the sponge rubber filler below normal atmospheric pressure whereby the sponge rubber filler contracts, mounting the filler within the tire casing while the filler is in a contracted state, mounting the casing and filler on the rim while the filler is in a contracted state, permitting the filler to expand after the casing is mounted on the rim, and inflating the filler.

ALFRED N. IKNAYAN.